(12) United States Patent
Balakrishna et al.

(10) Patent No.: US 11,182,706 B2
(45) Date of Patent: *Nov. 23, 2021

(54) PROVIDING SUITABLE STRATEGIES TO RESOLVE WORK ITEMS TO PARTICIPANTS OF COLLABORATION SYSTEM

(71) Applicant: International Business Machines Corporation, Armonk, NY (US)

(72) Inventors: Abhishek Shetty Balakrishna, Puttur (IN); Sivaranjani Kathirvel, Dharapuram TK (IN); Shunmugaraja Periadurai, Ayanpuram (IN); Sriharidatta Sriharidatta, NR Mohalla (IN)

(73) Assignee: International Business Machines Corporation, Armonk, NY (US)

( * ) Notice: Subject to any disclaimer, the term of this patent is extended or adjusted under 35 U.S.C. 154(b) by 559 days.

This patent is subject to a terminal disclaimer.

(21) Appl. No.: 15/811,236

(22) Filed: Nov. 13, 2017

(65) Prior Publication Data

US 2019/0147386 A1    May 16, 2019

(51) Int. Cl.
*G06Q 10/06* (2012.01)
*G06Q 30/00* (2012.01)

(52) U.S. Cl.
CPC . *G06Q 10/063112* (2013.01); *G06Q 10/0637* (2013.01); *G06Q 10/063118* (2013.01); *G06Q 30/016* (2013.01)

(58) Field of Classification Search
CPC ...... G06F 40/30; G06F 40/284; G06F 40/279; G06N 3/0454; G06N 20/00; G06Q 10/063112
See application file for complete search history.

(56) References Cited

U.S. PATENT DOCUMENTS 9,037,464 B1* 5/2015 Mikolov ................. G06F 40/30
704/255
2005/0060217 A1 3/2005 Douglas et al.
(Continued)

OTHER PUBLICATIONS

Word2vec from Wikipedia.*
(Continued)

*Primary Examiner* — Johnna R Loftis
(74) *Attorney, Agent, or Firm* — Robert A. Voigt, Jr.; Winstead PC

(57) ABSTRACT

A method, system and computer program product for improving collaboration among participants in a collaboration system. In one embodiment of the present invention, a system, referred to herein as the "integration system," connected to a collaboration system monitors for comments or updates pertaining to a work item involving a customer problem to be resolved by different participants of the collaboration system. These comments or updates for completing the work item are analyzed. After analyzing the comments or updates, strategies are derived for completing the work item based on the analysis of the comments or updates as well as based on stored data of previously resolved work items. The derived strategies are then presented to the appropriate participant(s) to resolve the work item, such as based on the roles of the participant(s) that would most effectively and efficiently perform the strategy.

20 Claims, 5 Drawing Sheets

(56) References Cited

U.S. PATENT DOCUMENTS

| | | | |
|---|---|---|---|
| 2013/0051545 A1* | 2/2013 | Ross | H04M 3/523 379/265.02 |
| 2014/0108103 A1 | 4/2014 | Romaine et al. | |
| 2014/0214938 A1 | 7/2014 | Bhatt et al. | |
| 2016/0189047 A1* | 6/2016 | Meij | G06F 40/295 706/11 |
| 2016/0260430 A1* | 9/2016 | Panemangalore | G10L 15/1822 |
| 2016/0269554 A1* | 9/2016 | Cecchi | H04M 3/5175 |
| 2017/0154295 A1* | 6/2017 | Fang | G06Q 30/0269 |
| 2017/0206897 A1* | 7/2017 | Jiang | G10L 13/08 |
| 2017/0286972 A1* | 10/2017 | Hausler | G06Q 30/016 |
| 2018/0032874 A1* | 2/2018 | Sanchez | G06Q 10/10 |
| 2018/0197072 A1* | 7/2018 | Hausler | G06N 3/0454 |
| 2019/0042988 A1* | 2/2019 | Brown | G06F 16/9535 |
| 2020/0134103 A1* | 4/2020 | Mankovskii | G06F 16/904 |

OTHER PUBLICATIONS

Mlkolov et al. Efficient Estimation of Word Representations in VectorSpace. 2013.*

List of IBM Patents or Patent Applications Treated as Related, Apr. 29, 2019, pp. 1-2.

Office Action for U.S. Appl. No. 16/395,725 dated Apr. 1, 2020, pp. 1-21.

Office Action for U.S. Appl. No. 16/395,725 dated Sep. 23, 2020, pp. 1-21.

Office Action for U.S. Appl. No. 16/395,725 dated Jul. 21, 2021, pp. 1-7.

Office Action for U.S. Appl. No. 16/395,725 dated Feb. 10, 2021, pp. 1-27.

Google, "Word2Vec," Google Code Archive, Jul. 29, 2013, pp. 1-8.

Adrian Colyer, "The Amazing Power of Word Vectors," Apr. 21, 2016, pp. 1-17.

* cited by examiner

PROVIDING SUITABLE STRATEGIES TO RESOLVE WORK ITEMS TO PARTICIPANTS OF COLLABORATION SYSTEM

TECHNICAL FIELD

The present invention relates generally to collaboration systems, and more particularly to providing suitable strategies to resolve work items to participants of a collaboration system.

BACKGROUND

Collaboration systems are systems designed to allow multiple participants to collaboratively work towards achieving a common goal. Usually, such systems provide a collaboration platform where different people from different teams engage and perform their work. Examples of such systems include the program management report (PMR) system and the rational team concert (RTC) system.

In such collaboration systems, a work item involving a customer problem is identified and multiple participants collaborate together with the aim of providing a resolution to the work item.

Currently though, in such collaboration systems, participants collaborate amongst each other in an unproductive way. For example, comments or updates to a work item may be made by an individual or group; however, other participants to the collaboration system may need additional information from the poster of the comments or updates in order to complete his/her tasks to assist in collaboratively resolving the work item. That is, there may be participants who require further information than the information contained in the comments or updates in order to assist them in resolving the work item. As a result, these participants will contact the source of the comments or updates for further information. Such a process involves back and forth engagement resulting in loss of time.

In another example, there is no mechanism for assisting the participants to effectively complete the work item. For example, there is no mechanism for developing strategies for assisting participants to complete the work in an efficient manner with limited delays.

Hence, current collaboration systems are deficient in terms of ensuring productive collaboration among participants in the system.

SUMMARY

In one embodiment of the present invention, a method for improving collaboration among participants in a collaboration system comprises monitoring for comments or updates pertaining to a work item involving a customer problem to be resolved by different participants of the collaboration system. The method further comprises analyzing the comments or updates for completing the work item. The method additionally comprises deriving, by a processor, strategies for completing the work item based on the analysis of the comments or updates as well as based on stored data of previously resolved work items. Furthermore, the method comprises presenting the strategies for completing the work item to one or more of the participants to resolve the work item.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for improving collaboration among participants in a collaboration system. In one embodiment of the present invention, a system, referred to herein as the "integration system," connected to a collaboration system monitors for comments or updates pertaining to a work item involving a customer problem to be resolved by different participants of the collaboration system. The integration system then analyzes the comments or updates for completing the work item. After analyzing the comments or updates, the integration system derives strategies for completing the work item based on the analysis of the comments or updates as well as based on stored data of previously resolved work items. "Strategies," as used herein, refer to the plan of action or policy designed to accomplish the task or tasks required to be performed by a participant in order to collaboratively resolve the work item. For example, the analysis of the comments or updates may indicate that the customer requires an update to the webpage to include content related to the division series in Major League Baseball®. Based on the stored data of previously resolved work items, participants with the role of developers were most effective in resolving this task. Furthermore, based on the stored data of previously resolved work items, it may be determined that some methods of updating the webpage were more effective than other methods, especially in connection with updating content pertaining to baseball scores. Such information may be utilized by the integration system to develop various strategies. The derived strategies are then presented to the appropriate participant(s) to resolve the work item, such as based on the roles of the participant(s) that would most effectively and efficiently perform the strategy. In this manner, collaboration among participants in the collaboration system to resolve the work item is improved.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
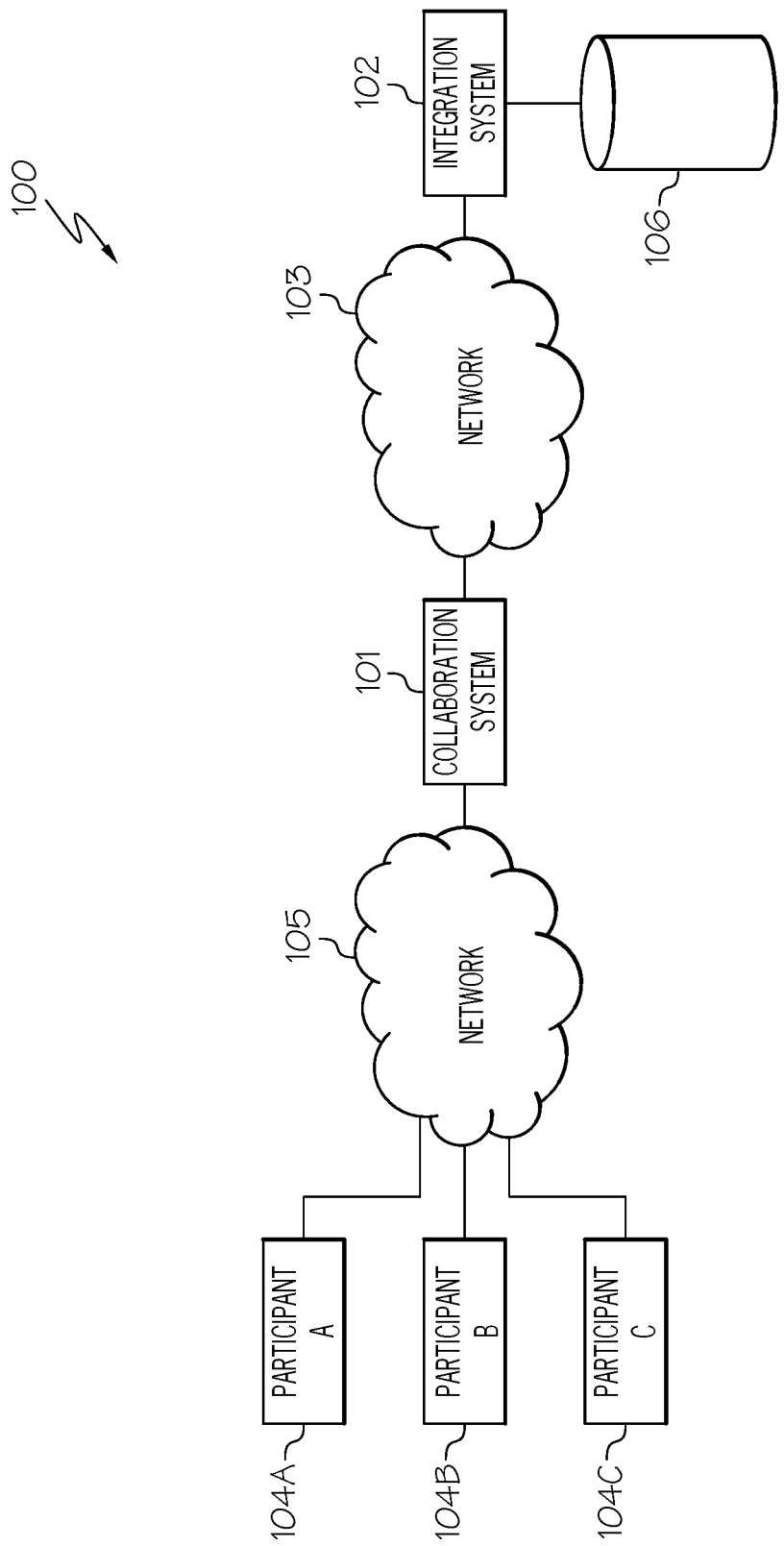
FIG. 1 illustrates a system for improving the productivity of participants in a collaboration system in accordance with an embodiment of the present invention.

Referring now to the Figures in detail, FIG. 1 illustrates a system 100 for improving the productivity of participants in a collaboration system in accordance with an embodiment of the present invention.

System 100 includes a collaboration system 101 connected to an integration system 102 via a network 103. Collaboration system 101 (e.g., program management report (PMR) collaboration system, rational team concert (RTC) collaboration system) includes any type of system involving collaboration among participants 104A-104C (identified as "Participant A," "Participant B," and "Participant C," respectively) (both participants and the participants' computing devices are identified with element 104) via a network 105 connected to collaboration system 101. For example, participants 104A-104 C may collaboratively work with each other to resolve a work item using their computing devices (e.g., smartphone, desktop computer) via collaboration system 101. Participants 104A-104C may collectively or individually be referred to as participants 104 or participant 104, respectively. Participant 104, as used herein, refers to any person (or computing device utilized by such a person) who is collaborating among other participants to resolve a work item via collaboration system 101.

Participants' computing devices 104 may be a portable computing unit, a Personal Digital Assistant (PDA), a smartphone, a laptop computer, a mobile phone, a navigation device, a game console, a desktop computer system, a workstation, an Internet appliance and the like.

Networks 103, 105 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

As discussed above, participants 104 collaboratively work with each other to resolve a work item using their computing devices (e.g., smartphone, desktop computer) via collaboration system 101. A "work item," as used herein, refers to a customer problem to be resolved by different participants 104 of collaboration system 101. In one embodiment, the work item consists of different names and types based on the particular collaboration system 101. For example, the work item may be referred to as a "ticket," such as in the Jira® collaboration system. In such a collaboration system, there will be a series of updates to the work item. In another example, the work item may be referred to as a "report" or "record," such as in the program management report (PMR) collaboration system. In a further example, the work item may be referred to as simply a "work item," such as in the rational team concert (RTC) collaboration system. In these systems (PMR collaboration system and RTC collaboration system), there will be a series of comments to the work item.

Furthermore, as discussed above, system 100 includes integration system 102. Integration system 102, as discussed further below, improves collaboration amongst participants 104 in collaboration system 101, such as by deriving strategies for completing the work item based on analyzing the comments or updates to the work items as well as based on stored data of previously resolved work items. In one embodiment, the data pertaining to previously resolved work items is stored in database 106 connected to integration system 102. Such strategies are presented to participants 104 to assist them in completing the work item. A description of the hardware configuration of integration system 102 is provided below in connection with FIG. 2.

System 100 is not to be limited in scope to any one particular architecture. System 100 may include any number of collaboration systems 101, integration systems 102, networks 103, participants 104 and networks 105. Furthermore, while system 100 illustrates multiple networks 103, 105, system 100 may include a single network connecting participants 104, collaboration system 101 and integration system 102.

Figure 2:
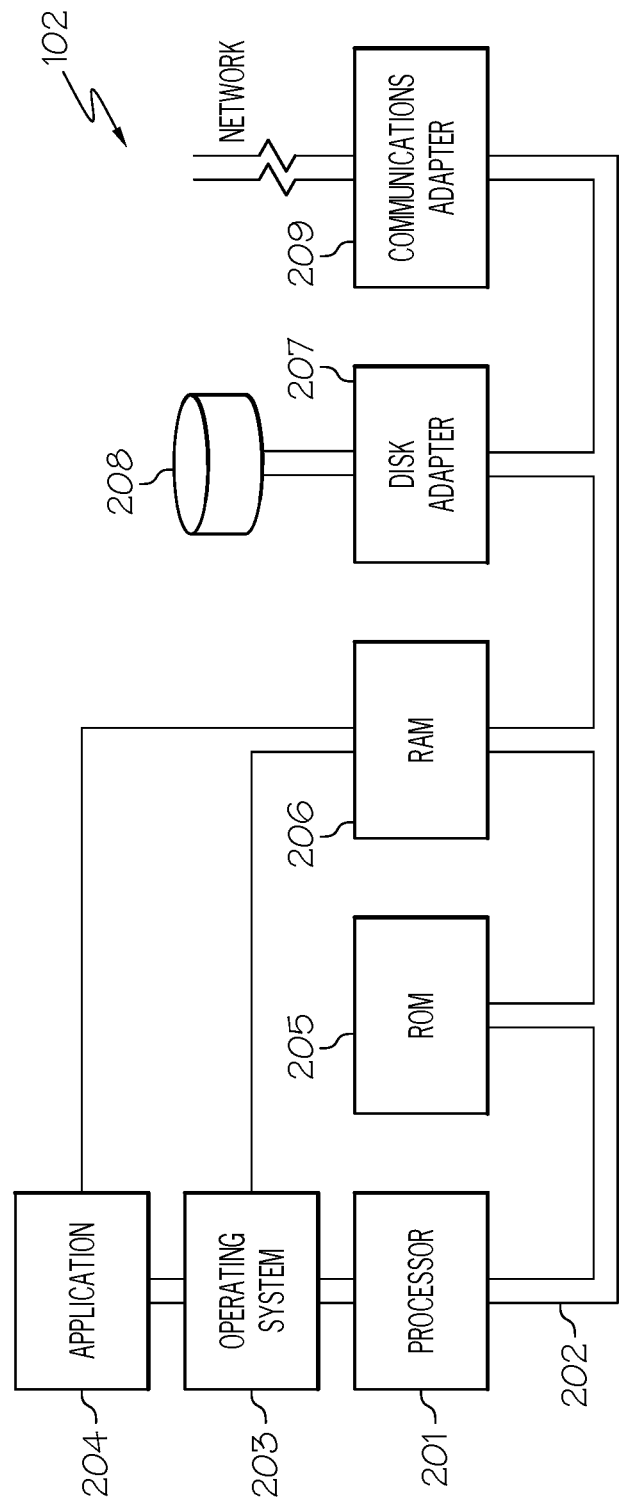
FIG. 2 illustrates an embodiment of the present invention of a hardware configuration of an integration system which is representative of a hardware environment for practicing the present invention.

Referring now to FIG. 2, FIG. 2 illustrates an embodiment of the present invention of a hardware configuration of integration system 102 (FIG. 1) which is representative of a hardware environment for practicing the present invention. Referring to FIG. 2, integration system 102 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for improving collaboration amongst participants 104 in collaboration system 101 as discussed further below in connection with FIGS. 3-5.

Referring again to FIG. 2, read-only memory ("ROM") 205 is coupled to system bus 202 and includes a basic input/output system ("BIOS") that controls certain basic functions of integration system 102. Random access memory ("RAM") 206 and disk adapter 207 are also coupled to system bus 202. It should be noted that software components including operating system 203 and application 204 may be loaded into RAM 206, which may be integration system's 102 main memory for execution. Disk adapter 207 may be an integrated drive electronics ("IDE") adapter that communicates with a disk unit 208, e.g., disk drive. It is noted that the program for improving collaboration amongst participants 104 in collaboration system 101, as discussed further below in connection with FIGS. 3-5, may reside in disk unit 208 or in application 204.

Integration system 102 further includes a communications adapter 209 coupled to bus 202. Communications adapter 209 interconnects bus 202 with an outside network (e.g., network 103 of FIG. 1) thereby allowing integration system 102 to communicate with other devices, such as collaboration system 101.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, in collaboration systems, a work item involving a customer problem is identified and multiple participants collaborate together with the aim of providing a resolution to the work item. Currently though, in such collaboration systems, participants collaborate amongst each other in an unproductive way. For example, comments or updates to a work item may be made by an individual or group; however, other participants to the collaboration system may need additional information from the poster of the comments or updates in order to complete his/her tasks to assist in collaboratively resolving the work item. That is, there may be participants who require further information than the information contained in the comments or updates in order to assist them in resolving the work item. As a result, these participants will contact the source of the comments or updates for further information. Such a process involves back and forth engagement resulting in loss of time. In another example, there is no mechanism for assisting the participants to effectively complete the work item. For example, there is no mechanism for developing strategies for assisting participants to complete the work in an efficient manner with limited delays. Hence, current collaboration systems are deficient in terms of ensuring productive collaboration among participants in the system.

Figure 3:
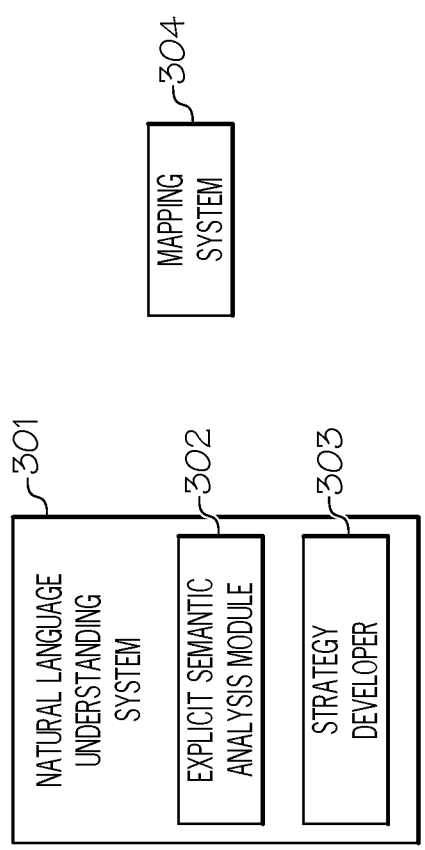
FIG. 3 is a diagram of the software components of the integration system used to improve collaboration among the participants in the collaboration system in accordance with an embodiment of the present invention.
Figure 4:
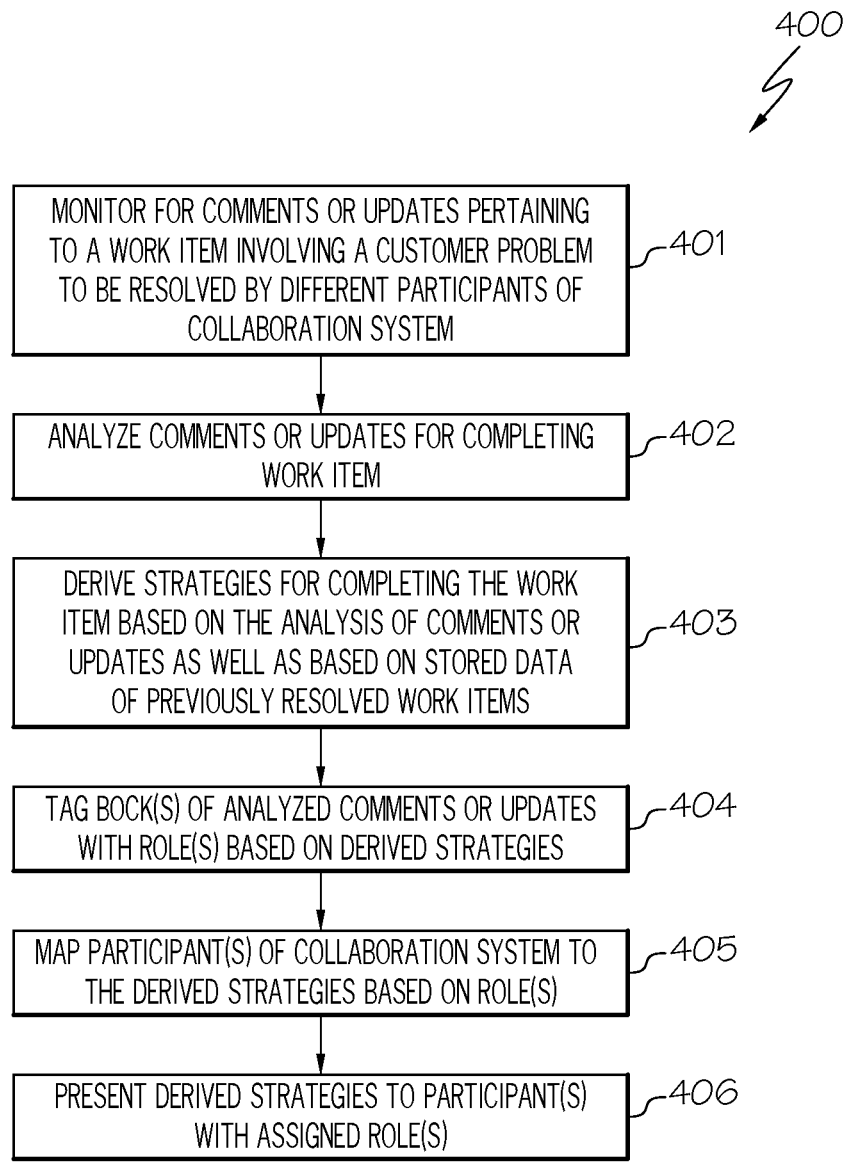
FIG. 4 is a flowchart of a method for improving collaboration among the participants in the collaboration system in accordance with an embodiment of the present invention.
Figure 5:
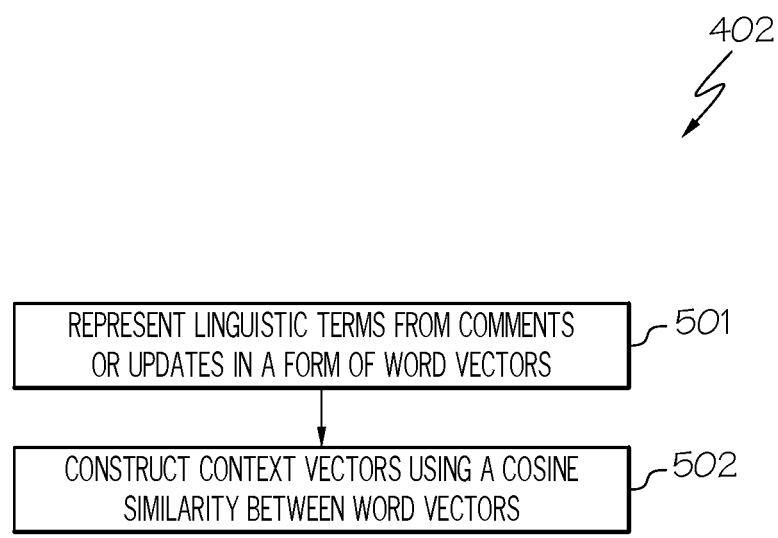
FIG. 5 is a flowchart of a method for analyzing comments or updates for completing the work item in accordance with an embodiment of the present invention.

The principles of the present invention provide a means for improving collaboration among participants in a collaboration system, such as by deriving strategies for completing the work item based on analyzing the comments or updates to the work items as well as based on stored data of previously resolved work items as discussed below in connection with FIGS. 3-5. FIG. 3 is a diagram of the software components of integration system 102 used to improve collaboration among participants 104 in collaboration system 101. FIG. 4 is a flowchart of a method for improving collaboration among participants 104 in collaboration system 101. FIG. 5 is a flowchart of a method for analyzing comments or updates for completing the work item.

As stated above, FIG. 3 is a diagram of the software components of integration system 102 (FIGS. 1 and 2) used to improve collaboration among participants 104 in collaboration system 101 in accordance with an embodiment of the present invention. In one embodiment, these software components may reside in application 204 (FIG. 2) of integration system 102.

The following provides a brief description of these software components. A more detailed description of these software components (including their functionalities) is provided below in conjunction with FIGS. 4-5.

Referring to FIG. 3, in conjunction with FIGS. 1-2, integration system 102 utilizes a natural language understanding (NLU) system 301 using Word2vec models to produce word embeddings. In one embodiment, these models are shallow, two-layer neural networks that are trained to reconstruct linguistic contexts of words. Word2vec takes as its input a large corpus of text and produces a vector space, typically of several hundred dimensions, with each unique word in the corpus being assigned a corresponding vector in the space. Word vectors are positioned in the vector space such that words that share common contexts in the corpus are located in close proximity to one another in the space.

In one embodiment, the typical vector representation of text corpus data is the following:

$$W_1 \rightarrow \{\langle W_x, V_x \rangle, \langle W_y, V_y \rangle \ldots \langle W_n, V_n \rangle\}$$
$$W_2 \rightarrow \{\langle W_x, V_x \rangle, \langle W_y, V_y \rangle \ldots \langle W_n, V_n \rangle\}$$
$$\ldots$$
$$W_n \rightarrow \{\langle W_x, V_x \rangle, \langle W_y, V_y \rangle \ldots \langle W_n, V_n \rangle\}$$

$W_1, W_2, \ldots W_n$ represents the unique words in the textual comments or updates, which are considered the centroid for the word vector. Furthermore, $W_x, W_y, \ldots W_n$ represent the related words for the centroid and $V_x, V_y, \ldots V_n$ represent the weightage value, which may be user selected.

In one embodiment, the output will be used for the complex derivative of NLU system 301, such as the semantic and syntactic context of the comments or updates made by participants 104. Such a vector representation is provided as input to the explicit semantic analysis module 302.

Explicit semantic analysis (ESA) module 302 is used to construct the context vector or sentence vector from the input word vector. The context vector from ESA module 302 reproduces the context of the participant's comments or updates in collaboration system 101.

In one embodiment, the context vector is built using the cosine similarity between the word vectors. The word vectors will be decomposed to the concept matrix [X], where the concept matrix [X] (shown below) is the m x k matrix, where m represents the segments of the comments or updates and k represents the concepts derived from the comments or updates.

$$[X] = \begin{Bmatrix} Cx1 & Cx2 & \ldots & Cxn \\ Cy1 & Cy2 & \ldots & Cyn \\ Cn1 & Cn2 & \ldots & Cnn \end{Bmatrix}$$

NLU system 301 may include a strategy developer 303 configured to derive strategies to complete the work item based on the analysis of the comments or updates as well as based on the stored data of previously resolved work items, such as stored in database 106. "Strategies," as used herein, refer to the plan of action or policy designed to accomplish the task or tasks required to be performed by participant 104 in order to collaboratively resolve the work item. In one embodiment, strategy developer 303 derives strategies based on the context vector and then labels such strategies, such as based on the identified context. Division of these strategies (i.e., assigning these strategies to the appropriate participants 104) is based in part by tagging the appropriate block of comments or updates (comments or updates that were analyzed to derive the strategies) with a role(s) (e.g., manager, developer) based on the derived strategies. For example, based on the stored data of previously resolved work items, strategies involving updating a website layout were performed by participants assigned the role of developer. As a result, the comments or updates involving updating a website layout are tagged with the role of developer.

Participants 104 of collaboration system 101 are then mapped to the derived strategies based on these roles by mapping system 304. For example, participants 104 that are assigned the role of developer may be mapped to the derived strategies for updating the website layout discussed in the analyzed comments or updates. In one embodiment, collaboration system 101 provides mapping system 304 with a list of participants 104 for each role (e.g., developer, manager, technical architect). In one embodiment, using such information, mapping system 304 maps a participant 104 to the derived strategies, such as those participants who have been assigned that role by collaboration system 101 and have been previously working to resolve the customer problem for this particular work item.

The derived strategies are then presented to the participant 104 with the assigned role (along with the appropriately tagged comments or updates) by integration system 102 as discussed in further detail below in connection with FIGS. 4-5.

FIG. 4 is a flowchart of a method 400 for improving collaboration among participants 104 in collaboration system 101 in accordance with an embodiment of the present invention.

Referring to FIG. 4, in conjunction with FIGS. 1-3, in step 401, integration system 102 monitors for comments or updates pertaining to a work item involving a customer problem to be resolved by different participants 104 of collaboration system 101. In one embodiment, such comments and updates include a combination of structured and unstructured data.

In step 402, integration system 102 analyzes the comments or updates for completing the work item. For example, the analysis of the comments or updates may indicate that the customer requires an update to the webpage to include content related to the division series in Major League Baseball®. In one embodiment, such an analysis may be performed using natural language processing. For example, keywords, such as "update" or "change content," may be identified. Furthermore, the meaning of such comments or updates may be inferred using natural language processing, such as identifying the term "bat" in connection with the term "baseball." Since baseball was used in connection with the term "bat," the term "bat" is interpreted as a wooden instrument for hitting a baseball as opposed to a flying mammal.

A discussion regarding analyzing the comments or updates for completing the work item is provided below in connection with FIG. 5.

FIG. 5 is a flowchart of the method for analyzing the comments or updates for completing the work item (see step 402 of FIG. 4) in accordance with an embodiment of the present invention.

Referring to FIG. 5, in conjunction with FIGS. 1-4, in step 501, integration system 102, such as NLU system 301, represents the linguistic terms from the comments or updates in the form of word vectors as discussed above. In one embodiment, integration system 102 utilizes the Word2vec models to produce these word vectors, which are positioned in the vector space such that words that share common contexts in the corpus are located in close proximity to one another in the space. As previously discussed, these word vectors may include a centroid representing the unique words in the textual comments, the related words for the centroid as well as the weightage value.

In step 502, integration system 102, such as ESA module 302, constructs context vectors using a cosine similarity between the word vectors. In this manner, ESA module 302 reproduces the context of the participant's comments or updates in collaboration system 101.

Returning to FIG. 4, in conjunction with FIGS. 1-3 and 5, in step 403, integration system 102, such as strategy developer 303, derives strategies for completing the work item based on the analysis of the comments or updates (such as based on the context vectors) as well as based on stored data of previously resolved work items. These strategies are used to ensure productive collaboration among participants 104 in collaboration system 101. As discussed above, "strategies," as used herein, refer to the plan of action or policy designed to accomplish the task or tasks required to be performed by participant 104 in order to collaboratively resolve the work item. For example, the analysis of the comments or updates may indicate that the customer requires an update to the webpage to include content related to the division series in Major League Baseball®. Based on the stored data of previously resolved work items, participants with the role of developers were most effective in resolving this task. Furthermore, based on the stored data of previously resolved work items (e.g., stored in database 106), it may be determined that some methods of updating the webpage were more effective than other methods, especially in connection with updating content pertaining to baseball scores. Such information may be utilized by integration system 102 to develop various strategies. In one embodiment, integration system 102 may rank the derived strategies based on how effective such strategies (or similar strategies) were in resolving the same or similar work items using the stored data of previously resolved work items.

In one embodiment, strategies may be labelled (e.g., a first strategy is labeled as strategy S1, a second strategy is labeled as strategy S2, etc.) in many different manners. For example, the strategies may be labelled based on the identified context. In another example, the strategies may be labelled based on the surface lexicon.

In step 404, integration system 102, such as strategy developer 303, tags block(s) of the analyzed comments or updates with role(s) based on the derived strategies. In one embodiment, the roles of participants 104 of collaboration system 101 are provided to integration system 102 by collaboration system 101. In one embodiment, the roles that are assigned to the analyzed comments or updates are based on the previously stored data pertaining to the resolved work items. For example, data pertaining to the work items that were resolved may include all of the participants' roles that were involved in completing the work items as well as the strategies used by each of those participants. Based on the derived strategies for addressing the comments or updates (such as the issue raised in the comments or updates), the particular roles for accomplishing such strategies may be identified based on the stored data pertaining to the resolved work items. Those roles may then be associated or tagged to those comments or updates.

In step 405, integration system 102, such as mapping system 304, maps participant(s) 104 of collaboration system 101 to the derived strategies based on the tagged role(s). In one embodiment, collaboration system 101 provides integration system 102 with a list of participants 104 for each role (e.g., developer, manager, technical architect). In one embodiment, using such information, integration system 102 maps a participant 104 to the derived strategies, such as those participants who have been assigned that role by collaboration system 101 and have been previously working to resolve the customer problem for this particular work item. Furthermore, in one embodiment, integration system 102 may map a particular participant 104 to the derived strategies based on the previously stored data pertaining to the resolved work items. For example, a participant 104 may be selected to be mapped if that participant 104 had previously resolved the work item successfully in an efficient manner.

In step 406, integration system 102 presents the derived strategies (along with the appropriately tagged comments or updates) to participant(s) 104 with the assigned role(s). These strategies are used by participant 104 to assess the customer problem, such as from different dimensions in solving the customer problem efficiently and effectively. Participant 104 may then select one of these strategies to collaboratively resolve the work item. By presenting strategies of varying dimensions to participants 104, including strategies not contemplated by participants 104, participants 104 are able to select a strategy that may more effectively and efficiently resolve the work item than previous attempts.

In this manner, the technical problem of collaboration systems being deficient in terms of ensuring productive collaboration among participants in the system is addressed by the present invention. As discussed above, the present invention provides a technological solution to the technical problem by improving productive collaboration among participants in the collaboration system, such as by deriving strategies for completing the work item based on analyzing the comments or updates to the work items as well as based on stored data of previously resolved work items.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for improving collaboration among participants in a collaboration system, the computer program product comprising a computer readable storage medium having program code embodied therewith, the program code comprising the programming instructions for:
monitoring, by an integration system, for comments or updates pertaining to a work item involving a customer problem to be resolved by different participants of said collaboration system, wherein computing devices of said participants are connected to said collaboration system via a first network, wherein said integration system is connected to said collaboration system via a second network, wherein said integration system utilizes a natural language understanding system using Word2vec models to produce word embeddings;
analyzing, by said integration system, said comments or updates for completing said work item using natural language processing by representing linguistic terms from said comments or updates in a form of word vectors, wherein said Word2vec models are utilized to produce said word vectors;
deriving, by said integration system, strategies for completing said work item based on said analysis of said comments or updates as well as based on stored data of previously resolved work items; and
presenting, by said integration system, said strategies for completing said work item to one or more of said participants to resolve said work item thereby improving collaboration among said participants in said collaboration system to resolve said work item.

2. The computer program product as recited in claim 1, wherein said natural language understanding system comprises an explicit semantic analysis module configured to construct a context vector or a sentence vector from an input word vector, wherein said context vector reproduces context of said comments or updates.

3. The computer program product as recited in claim 2, wherein said natural language understanding system further comprises a strategy developer configured to derive strategies to complete said work item based on said analysis of said comments or updates as well as based on said stored data of previously resolved work items.

4. The computer program product as recited in claim 1, wherein the program code further comprises the programming instructions for:
constructing context vectors using a cosine similarity between said word vectors.

5. The computer program product as recited in claim 4, wherein the program code further comprises the programming instructions for:
deriving said strategies from said context vectors.

6. The computer program product as recited in claim 5, wherein the program code further comprises the programming instructions for:
tagging a block of said comments or updates with a role based on said derived strategies.

7. The computer program product as recited in claim 6, wherein the program code further comprises the programming instructions for:
mapping a participant of said collaboration system to said derived strategies based on said role.

8. The computer program product as recited in claim 1, wherein said comments or updates comprise a combination of structured and unstructured data.

9. The computer program product as recited in claim 1, wherein said collaboration system comprises a program management report collaboration system or a rational team concert collaboration system.

10. The computer program product as recited in claim 1, wherein said word vectors include a centroid representing unique words in textual comments, related words for said centroid as well as a weightage value.

11. An integration system, comprising:
a memory for storing a computer program for improving collaboration among participants in a collaboration system; and
a processor coupled to the memory, wherein the processor is configured to execute the program instructions of the computer program comprising:
monitoring for comments or updates pertaining to a work item involving a customer problem to be resolved by different participants of said collaboration system, wherein computing devices of said participants are connected to said collaboration system via a first network, wherein said integration system is connected to said collaboration system via a second network, wherein said integration system utilizes a natural language understanding system using Word2vec models to produce word embeddings;
analyzing said comments or updates for completing said work item using natural language processing by representing linguistic terms from said comments or updates in a form of word vectors, wherein said Word2vec models are utilized to produce said word vectors;
deriving strategies for completing said work item based on said analysis of said comments or updates as well as based on stored data of previously resolved work items; and
presenting said strategies for completing said work item to one or more of said participants to resolve said work item thereby improving collaboration among said participants in said collaboration system to resolve said work item.

12. The integration system as recited in claim 11, wherein wherein said natural language understanding system comprises an explicit semantic analysis module configured to construct a context vector or a sentence vector from an input word vector, wherein said context vector reproduces context of said comments or updates.

13. The integration system as recited in claim 12, wherein said natural language understanding system further comprises a strategy developer configured to derive strategies to complete said work item based on said analysis of said comments or updates as well as based on said stored data of previously resolved work items.

14. The integration system as recited in claim 11, wherein the program instructions of the computer program further comprise:

constructing context vectors using a cosine similarity between said word vectors.

15. The integration system as recited in claim 14, wherein the program instructions of the computer program further comprise:

deriving said strategies from said context vectors.

16. The integration system as recited in claim 15, wherein the program instructions of the computer program further comprise:

tagging a block of said comments or updates with a role based on said derived strategies.

17. The integration system as recited in claim 16, wherein the program instructions of the computer program further comprise:

mapping a participant of said collaboration system to said derived strategies based on said role.

18. The integration system as recited in claim 11, wherein said comments or updates comprise a combination of structured and unstructured data.

19. The integration system as recited in claim 11, wherein said collaboration system comprises a program management report collaboration system or a rational team concert collaboration system.

20. The integration system as recited in claim 11, wherein said word vectors include a centroid representing unique words in textual comments, related words for said centroid as well as a weightage value.

* * * * *